Nov. 8, 1960 W. GOERG, SR 2,958,941
FLUX-FILLED BRAZING ROD AND METHOD OF BRAZING WITH SAME
Filed Feb. 17, 1954
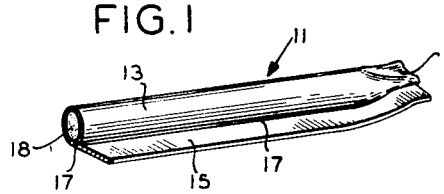
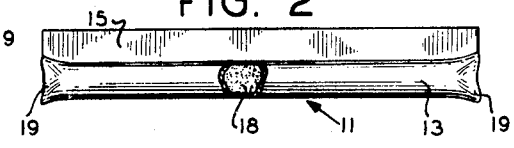
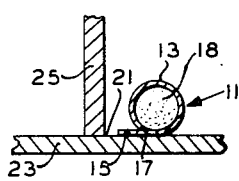
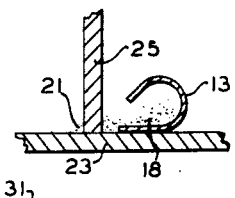
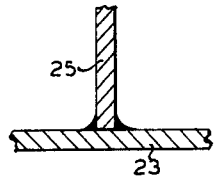
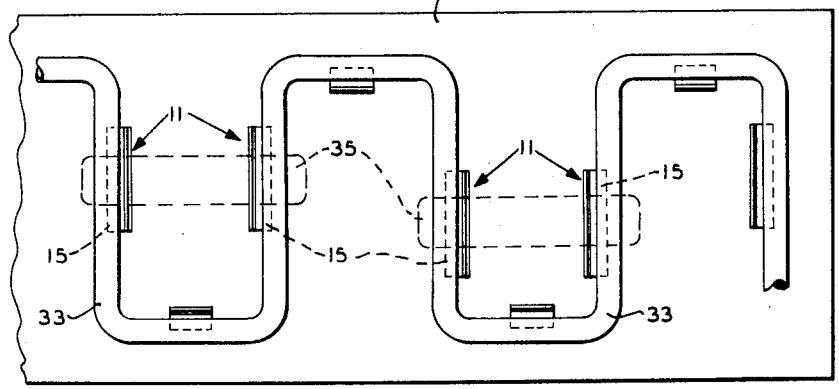
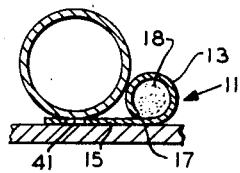
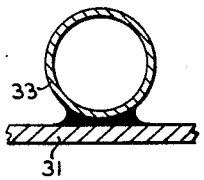
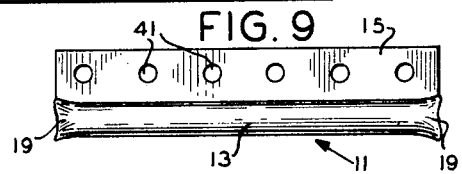
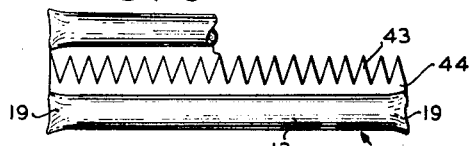
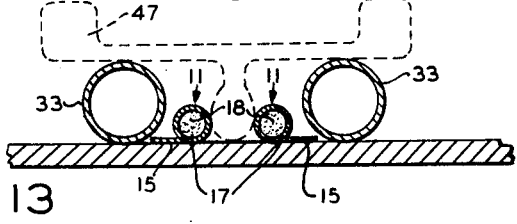
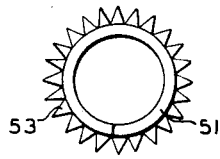
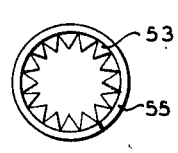
INVENTOR
WALTER GOERG Sr.
BY
ATTORNEY United States Patent Office 2,958,941
Patented Nov. 8, 1960

2,958,941

FLUX-FILLED BRAZING ROD AND METHOD OF BRAZING WITH SAME

Walter Goerg, Sr., Jersey City, N.J., assignor to Air Reduction Company, Incorporated, New York, N.Y., a corporation of New York Filed Feb. 17, 1954, Ser. No. 410,832

8 Claims. (Cl. 29—496)

This invention relates to the uniting of two metal articles by means of a flux and another metallic material which has a lower melting point than the two articles to be joined, such as occurs in brazing; and, in one aspect, deals specifically with the brazing of tubing, such as refrigeration tubing, to a plate.

In current commercial brazing practices, it is often customary to independently apply the flux to the surfaces of the articles to be joined at the location of the desired bond and then to apply heat to the flux, the lower melting point, metallic material or alloy and the two articles to be bonded; whereby, after the bonding surfaces are fluxed, the alloy melts and flows into contact with the two articles at the fluxed, bonding location. Upon cooling, a bond between the two articles results. Obviously, in this practice there is sometimes a decided disadvantage in having the independent step of applying the flux. In a specific instance of this commercial practice, refrigeration tubing is brazed to a plate by a method and apparatus which involves the use of a conveyor for moving the articles through a furnace. First, the plate is "painted" or coated with a liquid brazing flux and then the tubing is properly positioned on the plate with the brazing or alloy strip adjacent the point of contact between the lower part of the coil and the plate. Next, the conveyor moves the foregoing assembly (which is retained in assembled relation by weights) into and through a suitable furnace. In the furnace, the applied heat causes the flux which is spread over the plate to melt and flux the plate and the bottom of the tubing. Thereafter, the heat causes the brazing strip or alloy to melt and adhere, at the brazing line, to the tubing and the plate. As the final step, after bonding due to cooling, the assembly is washed or cleaned. Several disadvantages have been noted in the foregoing method. For instance, the quantity of flux which is used is excessive and, in a large part, wasted. Further and of great importance, this method of fluxing requires an appreciable amount of time in order to "paint" on, or to independently apply, the flux. The method of fluxing also causes a serious maintenance problem since the flux runs off the plate and corrodes the conveyor.

The primary object of the instant invention is to provide an improved method and means for brazing-type, metal joining by which the step of independently applying the flux is eliminated.

It is a further object of the instant invention to provide a method of fabricating the structural means for accomplishing the preceding object.

Another object of the instant invention is to provide an improved method and means for joining tubing to a plate which avoids the above-noted disadvantages due principally to independently applying the flux and which accomplishes the brazing in an improved manner.

In the disclosed, preferred embodiment of the invention, the above-mentioned primary object is accomplished by means of a straight length of a flux-cored brazing tube. This brazing tube is made by cold forming, with consequent work-hardening, a flat strip of the annealed alloy metal into a flux-cored tube device having a flat lip extending laterally from the longitudinal seam or line which is formed where the rolled lengthwise edge touches the strip. The flux-cored tube device is positioned adjacent a brazing line (formed between the two objects to be joined) so that the longitudinal seam faces towards the brazing line; and, when heat is applied, the tube opens and the molten flux flows to and along the brazing line. As the metal tube device melts, it follows the flux path to and along the brazing line; and so, upon cooling, the desired bond between the two objects results. The opening up of the tube upon the application of heat is inherent with the instant brazing device since the rolled tube part is work-hardened.

The accomplishment of the foregoing objects and others, along with features and advantages of the invention, will be apparent from the following description and the accompanying drawing, in which:

Fig. 1 is a broken perspective showing of one form of the flux-cored tube device and serves to illustrate the structure obtained when a flat strip has one edge portion rolled into a tube;

Fig. 2 is a partially cross-sectional, top view of the flux-cored tube device with its ends crimped so that air cannot contact the flux;

Fig. 3 is a cross sectional representation of the instant device suitably positioned for effecting a fillet joint between two flat plates upon heating;

Fig. 4 is an exaggerated representation of the Fig. 3 set-up after heating has been applied and the tube device has uncurled;

Fig. 5 is a representation of the joint which is finally effected with the Fig. 3 set-up;

Fig. 6 is a showing of refrigeration tubing, several flux-cored tube devices, and a plate all positioned for brazing;

Fig. 7 is an enlarged cross sectional view of a flux-cored tube device having a perforated lip which is especially suitable for the brazing job represented in Fig. 6;

Fig. 8 is a representation of the brazed joint achieved by the Fig. 6 and Fig. 7 set-ups;

Fig. 9 is a top view on reduced scale of the Fig. 7 device and shows the row of holes formed in the lip of the flux-cored tube device;

Fig. 10 is a top view of two flux-cored tube devices which have been made by rolling in the edges of a flat strip and then severing along the center line in a saw tooth fashion;

Fig. 11 is a cross-sectional view showing the Fig. 3 device when used with a particular weight-positioner in accomplishing the Fig. 6 brazing job;

Fig. 12 is a top view of a Fig. 11 type device formed into a doughnut shape with the saw teeth extending outwardly; and Fig. 13 is a view of a device similar to Fig. 12 except that the saw teeth are extending inwardly.

Referring to Figs. 1 and 2, the fabrication of the basic preferred form of the instant tube device 11 will be described. A flat strip of annealed metallic material which is suitable, such as a brazing alloy, for bonding the two metallic articles to be joined is formed by suitable means into the cold-rolled tube 13 having the flat lip 15 shown in Fig. 1. The fact that this step is done so that the rolled part is work-hardened, and remains so, is essential so that internal stresses will, upon the application of heat, cause the rolled part to open up or uncurl. In the fabrication, the rolled-over edge is brought into touching relation with the flat lip part or an intermediate flat portion of the strip, so that an approach towards gas-tightness is achieved. However, it is to be understood that nothing is done which will interfere with, or restrain, the opening of the tube part. This touching relation or joint 17 is effected so that the flux in the tube part will be easily retained and protected at this location in a substantial measure from the air. This joint 17 and others, which are formed by a work-hardened tube-like portion and a flat lip-like portion is hereinafter sometimes referred to as a "free-opening" joint. This term is intended to include the joint 17 just described, and other similar arrangements hereinafter described as well as other cross-sections and other tube-like structures or formations which will function, insofar as opening is concerned, in a manner which is essentially the same as described above. After forming the tube device shown in Fig. 1, the flux 18 is inserted by blowing the dry powder flux into the tube having one end blocked and then crimping both of the ends 19 as shown in Fig. 2. By crimping the ends with a dull tool, it is apparent that the tube device having the above-mentioned touching relation provides a suitable flux "package" which also gives an appreciable degree of protection from the air. It is to be understood that the particular flux is selected with due regard to its conventional function in relation to both the metallic articles to be joined and the alloy or filler metal for effecting the bond.

The method of joining with a suitable length of the above-described flux-cored tube device is illustrated somewhat schematically in Figs. 3 through 5. Thus, the tube device 11 is positioned adjacent the joining or brazing line 21 which is formed between a horizontal plate 23 and a plate 25, positioned perpendicularly thereto. The flat lip 15 is positioned, in this instance, close to the brazing line or location 21 but not touching the vertical plate 25. It is to be noted that the "free-opening" joint or seam 17 is facing the brazing line and so is properly oriented. When heated in one of the conventional manners, such as by a brazing torch, the composite brazing device 11 opens or uncurls, as is somewhat exaggeratedly shown in Fig. 4, and so permits molten flux to run out directly towards the brazing line. The molten flux will, by capillary attraction, flow into and along the brazing line whereby the brazing location surfaces of the plates which are to be joined are properly conditioned. Thereafter, the brazing alloy forming the tube device melts and follows the flux path to precisely the desired points, that is, where the flux has conditioned the brazing line or location and hence where the alloy is to adhere to the surfaces of the two articles to be joined. The alloy when cooled and hardened firmly joins the two plates, at both sides, in the manner indicated in Fig. 5.

In Fig. 6 which does not have parts drawn to scale, the first step in the method of bonding aluminum tubing to an aluminum plate so as to form a refrigeration evaporator is illustrated. The plate 31 which has not been coated with a flux has the length of tubing 33 placed thereon and then lengths of tubing which are similar to the above-described brazing device 11 but having slightly wider lip 15 than previously described, are placed at various locations. The tube devices 11 are positioned, essentially as above described; but, since they have wider lips 15, the lips extend under the tubing 33 and slightly beyond the lowest point of the tubing. Next, the assembly of the tubing, the plate, and the instant brazing devices are anchored by weights 35, two of which are indicated by a dashed-line outlines. With this arrangement, it is clear that a firm and proper positioning of all parts is obtained without complicated devices. The weight holds the tubing which, in turn, firmly positions the sections of the instant composite brazing rod. This weighted assembly is then passed by a steel belt-like conveyor through a furnace having precise temperature control wherein a result, similar to that described above, but here represented in Fig. 8, occurs. It is to be appreciated that the melted flux and alloy will move easily lengthwise of the tubing for appreciable distances so that the length and number of brazing tube-like devices can be suitably varied to produce a continuous bond, even around curves, or to produce an even heavier highly heat-conductive bond than suggested by Fig. 8. By capillary attraction, the molten flux will move rapidly and easily over and along the top of the lip 15 as well as around and under the lip and along the location adjacent the points of contact between the tubing and plate.

It is to be understood that this method of brazing a length of tubing to a plate can easily be modified to use the process illustrated in Figs. 3 through 5. Thus, if the chance of misalignment is slight, as may be the case when heat is applied without jarring, the brazing device can be positioned as shown in Fig. 3.

Two modifications of the brazing device which are especially suitable for the tubing-plate process of Fig. 6 are shown in Figs. 7, 9, and 10. In the Fig. 7 and Fig. 9 modification, it can be seen that the wide lip of the brazing device has been formed with a row of perforations 41. Fig. 10 shows another modification having angled slots 43 or conversely saw teeth 44. Both of these constructions provide the step of the flux contacting the plate 31 which is under the lip 15 without the flux moving over and then under the lip. The functioning of the perforations 41 for this purpose can be easily visualized by reference to Fig. 7. It is believed to be obvious how the V-shaped slots perform in a similar manner, whereby the molten flux can come in contact with the plate by moving through the slots rather than over and under the lip.

Another furnace method of joining tubing to a plate is depicted in Fig. 11. This method is similar to the above-suggested use of the Fig. 3 brazing device, but provides for secure positioning during jarring without the use of an elongated lip. The Fig. 1 brazing device, properly oriented, is urged towards the tubing by means of a weight 47 which is schematically shown by dashed lines. The weight is also suitable for pressing the tubing against the plate. The result which is effected by this type of a weight is that the tubing is held down while the oriented brazing device is retained in proper position. Thus, the weight 47 constitutes one form of a means for urging the tubing against the plate and for maintaining the oriented brazing device in suitable relation to the brazing location. It is to be noted that weight 47 maintains two oriented devices in position in relation to two sections of tubing at the same time.

In the foregoing described brazing of aluminum tubing to an aluminum plate in order to form a part of the refrigeration evaporator, it is to be understood that many of the known aluminum fluxes are suitable and can be used. However, it is preferred to use such a flux which is not too deliquescent, especially if the brazing rod is not used after a brief period after filling. The brazing alloy which was formed into the brazing device was made from a high silicon aluminum alloy which includes about 10–15% silicon and copper in an appreciable percentage. The tubing and plate were formed from a high purity aluminum material. The preferred volume ratio of dry powder flux to alloy in the instant composite brazing device is about 4.5 to 1. This ratio was provided by having an 0.008 inch thick strip which was seven-eighths inch wide formed into a flux tube having an inside diameter of about 0.200 inch. Thus, the ratio of cross sectional areas and hence volumes is 0.007 to .0314 or about 1 to 4.5. The instant tube device has been made in long lengths of 36 to 80 inches and it is to be understood that the instant tube-like brazing structure can be made in any such length or desired smaller lengths. It can be filled with flux at the place of brazing if desired, rather than at the place of fabrication. In either case if the tube-like structure is of appreciable length, it can be easily cut into shorter lengths by a tool which will substantially seal the ends.

Two other modications of the instant invention are shown in Figs. 12 and 13. Both of these devices are formed from tube strips which are similar to those shown in Fig. 10. The circular tube 51 shown in Fig. 12 is formed by bending the strip so that the prongs or saw teeth 53 are pointed outward and then tacking, by soldering, for instance, the two crimped ends together. The Fig. 13 device, identified by reference numeral 55, is similarly formed except that the prongs or saw teeth 53 are extending inwardly. These two devices are especially adapted for joining the end of a pipe to a plate. It is apparent that the formation of the saw teeth will be suitably varied, depending upon which circular composite device is to be made.

It should be again noted that the tube structure of the instant composite brazing device partially uncurls, opening the longitudinal seam, when heated. No special provision is required in order to obtain this uncurling action since it is inherent in any metal member which is cold formed into tubing or a similar shape. With the longitudinal seam or "free-opening" joint properly facing or being oriented in relation to the brazing line or brazing location, it is apparent that melted flux is immediately directed in the proper direction. In this manner, the flux is automatically applied just at the point where, and at the time when, it is needed without a completely independent operation being required.

It is to be understood that the instant invention is suitable, by conventional selection of the flux and the alloy, for the joining of metallic objects, made from similar or dissimilar metals other than aluminum.

By crimping the ends of the instant flanged tube-like structure as shown in Fig. 2 and by making the "free-opening" joint with the degree of tightness described, it has been determined by "shelf-life" tests that the flux retains its effectiveness for extended periods.

A significant advantage derived from the instant invention is that much less of the expensive flux and less filler metal is required than is necessary in certain prior conventional practices in order to get the equivalent or, in some cases, superior brazed joints. It has been observed that bonds made with the instant invention are more dense than often obtained in previous practices. It is believed that the fact that a dry powder flux is used contributes to this result.

Insofar as the application of the instant invention in the brazing of parts by means of a continuous furnace operation is concerned, a very worthy benefit which is realized is the elimination of the corrosive effect on the conveying means, the furnace and associated apparatus which previously resulted from applying the flux in the form of a coating.

It is also to be appreciated that the savings in labor costs due to the fact that, with the instant invention, a fluid flux mixture does not need to be made or applied is quite significant. Further, the effort required for washing or cleaning the brazed job does not approach the amount of effort required in certain well known commercial practices.

It is to be understood that certain modifications in the disclosed devices and methods can be made by one skilled in the art without departing from the invention as defined in the following claims.

I claim:

1. A brazing rod for the joining of two metallic objects at a brazing location which requires fluxing, said rod being comprised of an integral longitudinal lip portion and a tubular portion filled with flux, the melting point of said flux being lower than the melting point of said rod; said rod being formed by bending a resilient flat strip of brazing metal so that the bent end of said tubular portion is in contact with the unbent flat lip portion along a line parallel to the axis of said tubular portion and spaced from the outer end of said flat portion; said bent end being characterized in that when heat is applied thereto, said end will move away from said flat portion and molten flux will flow toward said brazing location.

2. The brazing rod according to claim 1 and including the further feature that said unbent lip portion is perforated.

3. The brazing rod according to claim 1 and including the further feature that said unbent lip portion is notched.

4. A method of joining tubing to a flat surface element comprising positioning said tubing in the desired relation to said element so that a peripheral part of said tubing and a segment of said element form a joining line; setting up a filler metal device having an integral longitudinal lip portion and a particle-tight, cold-rolled tubular portion containing flux so that the end of said rolled portion is facing said joining line and the flat lip portion is adjacent said joining line; said tubular portion having been formed by bending a resilient strip of brazing metal so that the bent end of said tubular portion is in contact with the unbent flat lip portion along a line parallel to the axis of said tubular portion and spaced from the outer end of said flat portion; the melting point of said flux being lower than the melting point of said filler metal; and applying heat to said device whereby said flux melts, said bent end moves away from said lip portion, permitting fluid flux to flow to said joining line, and said filler metal melts and follows the path of said flux.

5. The method according to claim 4 and further including the feature of positioning said flat lip portion under said tubing.

6. The method according to claim 5 and being further characterized in that said flat portion has perforations therein and said flat portion under said tubing is positioned so that said perforations are adjacent said joining line.

7. A method of joining a length of tubing to a flat surface element comprising positioning said tubing in the desired relation to said element so that a peripheral part of said tubing and a segment of said element abuts to form a joining line; placing a relatively short length of a filler metal device having an integral longitudinal lip portion and a particle-tight cold-rolled tubular portion containing flux so that the edge of said flat portion is adjacent said joining line and said flat portion rests on said element; said cold-rolled tubular portion having been formed by bending a resilient strip of brazing metal so that the bent end of said tubular portion is in contact with the unbent flat lip portion along a line parallel to the axis of said tubular portion and spaced from the outer end of said flat portion; the melting point of said flux being lower than the melting point of said filler metal; and applying heat to said joining location whereby said flux melts, said rolled end moves away from said lip portion, and said molten flux flows to and along said tubing, and then said filler metal melts and follows the path of said flux to and along said tubing.

8. An improved method of brazing two metallic articles comprising positioning said articles for brazing so as to form a brazing line; setting up a filler metal device having an integral tubular portion containing flux and a substantially flat portion so that the end of said tubular portion is facing said brazing line and said flat portion is resting on one of said articles; said tubular portion having been formed by bending a resilient strip of brazing metal so that the bent end of said tubular portion is in contact with the outer end of the unbent flat portion along a line parallel to the axis of said tubular portion; the melting point of said flux being lower than the melting point of said filler metal; and applying heat to said brazing location whereby said bent end moves away from said flat portion, said flux melts and flows to said brazing line, and said filler metal melts and follows the path of said flux.

References Cited in the file of this patent

UNITED STATES PATENTS

| | | |
|---|---|---|
| 400,869 | Norton et al. | Apr. 2, 1889 |
| 607,504 | Crowther | July 19, 1898 |
| 1,272,000 | Blackmore | July 9, 1918 |
| 1,588,761 | Ligot | June 15, 1926 |
| 1,629,748 | Stoody | May 24, 1927 |
| 1,649,628 | Wales | Nov. 15, 1927 |
| 1,653,546 | Campbell | Dec. 20, 1927 |
| 1,690,534 | Erich | Nov. 6, 1928 |
| 1,698,360 | Day | Jan. 8, 1929 |
| 2,151,206 | Hawthorn | Mar. 21, 1939 |
| 2,157,918 | Rankin | May 9, 1939 |
| 2,370,036 | Howell | Feb. 10, 1945 |
| 2,565,477 | Crowell et al. | Aug. 28, 1951 |
| 2,645,816 | Trussell | July 21, 1953 |

FOREIGN PATENTS

| | | |
|---|---|---|
| 8,344 | Great Britain | of 1897 |
| 1,020,328 | France | Feb. 4, 1953 |

OTHER REFERENCES

Welding Handbook, 1942 edition, pp. 561 and 579, published by American Welding Society, 33 W. Thirty Ninth St., New York, N.Y.